(12) United States Patent
Li et al.

(10) Patent No.: US 12,232,281 B2
(45) Date of Patent: Feb. 18, 2025

(54) TAMPER-PROOFING ELECTRONIC SEAL

(71) Applicant: Xiamen Innov Information Science And Technology Co., Ltd., Xiamen (CN)

(72) Inventors: Zhongming Li, Xiamen (CN); Axia Lin, Xiamen (CN)

(73) Assignee: Xiamen Innov Information Science And Technology Co., Ltd., Xiamen (CN)

( * ) Notice: Subject to any disclaimer, the term of this patent is extended or adjusted under 35 U.S.C. 154(b) by 240 days.

(21) Appl. No.: 18/085,107

(22) Filed: Dec. 20, 2022

(65) Prior Publication Data

US 2024/0114636 A1 Apr. 4, 2024

Related U.S. Application Data

(63) Continuation of application No. PCT/CN2022/125261, filed on Oct. 14, 2022.

(30) Foreign Application Priority Data

Sep. 27, 2022 (CN) .......................... 202211182159.0

(51) Int. Cl.
*H05K 5/02* (2006.01)
*G06F 21/86* (2013.01)

(52) U.S. Cl.
CPC ........... *H05K 5/0208* (2013.01); *G06F 21/86* (2013.01); *H05K 5/0221* (2013.01)

(58) Field of Classification Search
CPC ..... H05K 5/0221; H05K 5/0208; G06F 21/86

USPC ........................................................ 726/34
See application file for complete search history.

(56) References Cited

U.S. PATENT DOCUMENTS

| | | | | |
|---|---|---|---|---|
| 5,189,396 | A * | 2/1993 | Stobbe | G09F 3/0335 340/540 |
| 5,912,621 | A * | 6/1999 | Schmidt | G06F 21/86 340/568.1 |
| 8,026,816 | B2 * | 9/2011 | Chao Cheng | G06K 19/041 340/568.1 |
| 8,905,318 | B2 * | 12/2014 | Lee | E05B 39/005 235/492 |
| 9,818,273 | B2 * | 11/2017 | Nekoogar | G08B 13/06 |
| 10,431,127 | B2 * | 10/2019 | Avalos | G09F 3/0335 |
| 10,546,441 | B2 * | 1/2020 | Joao | H04L 63/08 |

* cited by examiner

*Primary Examiner* — Amare F Tabor
(74) *Attorney, Agent, or Firm* — Stein IP, LLC

(57) ABSTRACT

The present disclosure provides a tamper-proofing electronic seal. The tamper-proofing electronic seal includes a shell, a lead seal rope, and a lead seal label. The lead seal label comprises a chip, an antenna circuit, a power supply, a power switch, and a potential detection circuit which are electrically connected. The power switch is arranged on a circuit, electrically connected to the chip, of the power supply. The potential detection circuit is electrically connected to the antenna circuit and the chip. A fixing hole and a locking hole are provided at positions, corresponding the potential detection circuit and the power switch, of the interior of the shell; the fixing end of the lead seal rope is clamped in the shell through the fixing hole; the use state of the electronic seal can be accurately marked, and the electronic seal is prevented from being tampered with or recycled.

7 Claims, 3 Drawing Sheets

TAMPER-PROOFING ELECTRONIC SEAL

CROSS-REFERENCE TO RELATED APPLICATIONS

This application is a continuation of International Application No. PCT/CN2022/125261, filed on Oct. 14, 2022, which claims priority to Chinese Patent Application No. 202211182159.0, filed on Sep. 27, 2022. The disclosures of the aforementioned applications are hereby incorporated by reference in their entireties.

TECHNICAL FIELD

The present disclosure relates to the field of an RFID (Radio Frequency Identification) electronic seal, and in particular to a tamper-proofing electronic seal.

BACKGROUND ART

Whether the existing RFID (Radio Frequency Identification) electronic seal has been used is identified by depending on an RED tag in combination with the appearance of the lead seal, that is, judged by the number of times of the RFID tag having been read in combination with the appearance states of the lead seal such as "unused", "blocked in use" and "removed". In the use process of the lead seal, it is necessary to ensure that the lead seal has been read more than once by an RFID reader every time. If an operator does not comply with the use process to read the seal, it will easily lead to the inconsistency between the current marking state and the actual state of the lead seal, which will easily be used to tamper with or falsify the lead seal, resulting a low security factor of the lead seal, and it is difficult to avoid cheating in the logistic transportation system, resulting in economic losses such as the loss of protected goods.

SUMMARY OF THE INVENTION

The technical problem to be solved by the present disclosure is to provide a tamper-proofing electronic seal. The actual state of the seal can be accurately marked, and the tamper-proofing electronic seal is prevented from being tampered with and recycled, so that the supervision security performance of the electronic seal is improved.

In order to solve the above technical problem, the technical solution adopted by the present disclosure is as follows.

The tamper-proofing electronic seal includes a shell, a lead seal rope, and a lead seal label arranged in the shell; and the lead seal label includes a chip, an antenna circuit, a power supply, a power switch, and a potential detection circuit.

The antenna circuit is electrically connected to the chip; the power supply is electrically connected to the chip through the power switch; and both ends of the potential detection circuit are electrically connected to the antenna circuit and the chip respectively.

A fixing hole is provided at a position, adjacent to the potential detection circuit, of the interior of the shell; a locking hole is provided at a position, corresponding to the power switch, of the interior of the shell; the fixing end of the lead seal rope passes through the fixing hole and is clamped in the shell; when the locking end of the lead seal rope passes through the locking hole, the locking end is fixedly connected to the shell and closes the power switch; and when the middle part of the lead seal rope is disconnected, the lead seal rope passes through the end of the fixing hole to move towards the potential detection circuit and disconnect the potential detection circuit.

The present disclosure has the beneficial effects that an RFID tag in the electronic seal adopts a semi-active electronic tag, the potential detection circuit is arranged in the semi-active electronic tag, and the power switch is arranged in a power circuit, so that two "sensor switches" which are in an actual use state are formed by the power switch and the potential detection circuit in the semi-active electronic tag; and a physical state mark of two times two is generated by the on-off of the potential detection circuit and the on-off of the power switch, thus, the lead seal label has different irreversible physical change marks in unlocked, locked and destroyed or unlocking states, then the use state of the electronic seal can be accurately marked, the electronic seal is prevented from being tampered with or recycled, and the supervision security performance of the electronic seal is improved.

Figure 1:
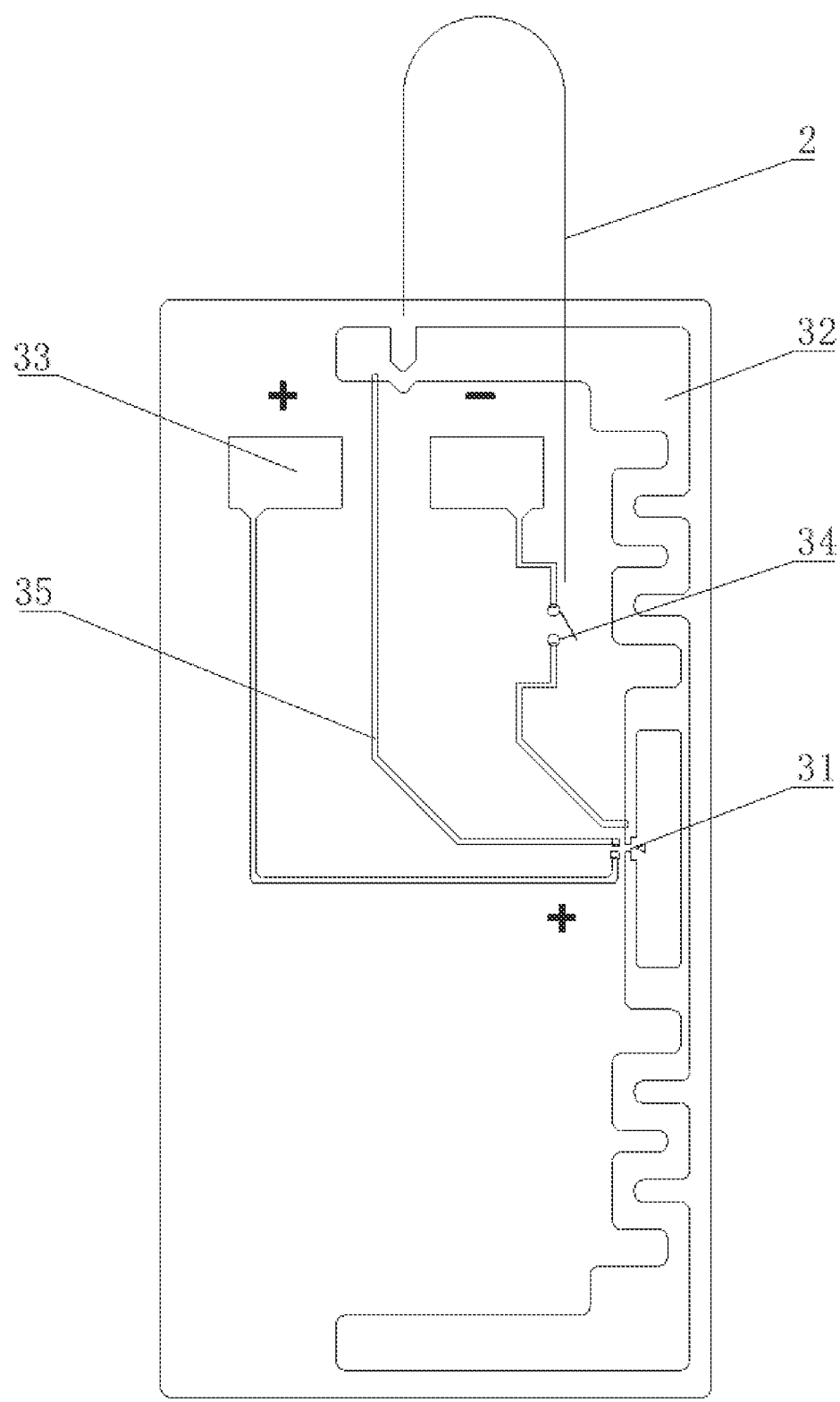
FIG. 1 is a principle circuit diagram of a tamper-proofing electronic seal according to an embodiment I of the present disclosure.

DESCRIPTION OF REFERENCE NUMERALS 1. shell; 11. blocking block; 11. fixing hole; 12. locking hole; 2. lead seal rope; 21. outer sheath; 22. inner rope; 23. compression spring; 24. hook knife; 3. lead seal label; 31. chip; 32. antenna circuit; 33. power supply; 34. power switch; 341. insulating strip; 342. power line; 35. potential detection circuit; and 36. through hole.

DETAILED DESCRIPTION OF THE INVENTION

In order to explain the technical contents, achieved objectives and effects of the present disclosure, detailed description will be made below in combination with embodiments and accompanying drawings.

The tamper-proofing electronic seal includes a shell, a lead seal rope, and a lead seal label arranged in the shell; and the lead seal label includes a chip, an antenna circuit, a power supply, a power switch, and a potential detection circuit.

The antenna circuit is electrically connected to the chip; the power supply is electrically connected to the chip through the power switch; and both ends of the potential detection circuit are electrically connected to the antenna circuit and the chip respectively.

A fixing hole is provided at a position, adjacent to the potential detection circuit, of the interior of the shell; a locking hole is provided at a position, corresponding to the power switch, of the interior of the shell; the fixing end of the lead seal rope passes through the fixing hole and is clamped in the shell; when the locking end of the lead seal rope passes through the locking hole, the locking end is fixedly connected to the shell and closes the power switch;

and when the middle part of the lead seal rope is disconnected, the lead seal rope passes through the end of the fixing hole to move towards the potential detection circuit and disconnect the potential detection circuit.

The working principle of the present disclosure is as follows: when the electronic seal is not in use, the power supply of the semi-active tag is not conducted with the chip, and is in a passive mode (the state code of the working mode is 0x0000); and when the electronic seal is in use, the lead seal rope is looped around a supervised locking structure, and is inserted into the locking hole of the shell and fixed, the lead seal rope passes through the locking hole and simultaneously triggers the power switch to close, so that the power supply is conducted to supply power to the chip, the tag is in a semi-active working mode (the state code of the working mode is 0x0003), and at this time, the potential detection circuit of the electronic seal is in good condition (the state code is 0 xB000). If the lead seal rope of the electronic seal is cut off to unlock a supervised object, the fixing end of the lead seal rope in the electronic seal is released, which causes the hook knife at one end of a compression spring to destroy the potential detection circuit, and at this moment, the chip detects that the potential detection circuit is destroyed (a new status code is 0xB0FF).

It can be seen from the above description that the present disclosure has the beneficial effects that an RFID tag in the electronic seal adopts a semi-active electronic tag, the potential detection circuit is arranged in the semi-active electronic tag, and the power switch is arranged in a power circuit, so that two "sensor switches" which are in an actual use state are formed by the power switch and the potential detection circuit in the semi-active electronic tag; and a physical state mark of two times two is generated by the on-off of the potential detection circuit and the on-off of the power switch, thus, the lead seal label has different irreversible physical change marks in unlocked, locked and destroyed or unlocking states, then the use state of the electronic seal can be accurately marked, the electronic seal is prevented from being tampered with or recycled, and the supervision security performance of the electronic seal is improved.

Further, the lead seal rope includes an outer sheath and an inner rope slidably arranged in the outer sheath. The end of the outer sheath is clamped in the fixing hole. The end of the inner rope passes through the fixing hole and extends into the shell. The compression spring is sleeved on the end, extending into the shell, of the inner rope. The end, facing away from the fixing hole, of the compression spring is fixedly connected to the inner rope. The outer diameter of the compression spring is larger than the inner diameter of the fixing hole. When the locking end of the lead seal rope passes through the locking hole and is fixed, the inner rope drives the compression spring to compress.

It can be seen from the above description that the lead seal rope is set to have two parts which are the outer sheath and the inner rope; the lead seal rope is inserted into the fixing hole through the inner rope, and is connected to the compression spring which is clamped at one side, facing the interior of the shell, of the fixing hole to realize the fixation of the fixing end of the lead seal rope; the inner rope can move in the outer sheath by clamping the outer sheath at a position, facing the exterior of the shell, of the fixing hole and the exterior of the shell; thus, when the locking end of the lead seal rope is inserted into the locking hole and fixed, the inner rope is pulled toward the exterior of the shell in the outer sheath, one end, facing the fixing hole, of the compression spring is pressed against the fixing hole, and the other end of the compression spring is pulled by the inner rope to compress, and a compressed state is kept to store elastic potential energy in the locked state of the electronic seal; and when the inner rope of the lead seal rope is disconnected, the elastic force of the compression spring returns to the original state to bounce the inner rope and the compression spring with the hook knife to the adjacent potential detection circuit, thereby damaging the potential detection circuit to generate an unlocking mark.

Preferably, a steel wire rope is used as the inner rope to prevent the lead seal rope from breaking easily; and the potential detection circuit is a fragile circuit, thereby ensuring that the potential detection circuit breaks under the impact of the spring and the inner rope.

Further, through holes are respectively provided on two sides, corresponding to the potential detection circuit, of the lead seal label; the hook knife is arranged at one end, far away from the fixing hole, of the compression spring; and one end of the hook knife passes through the through hole.

It can be seen from the above description that the through holes are provided on both sides, bearing the potential detection circuit of the circuit board, of the lead seal label to make the potential detection circuit relatively thin; and when the lead seal rope is cut off, as the hook knife for cutting is arranged at one end of the compression spring being compressed, the potential detection circuit can be cut off more easily after the lead seal rope is cut off, thereby ensuring that the actual physical state of the electronic seal is accurately marked.

Further, the power switch includes an insulating strip and a power line. One end of the power line is electrically connected to the chip, and the other end of the power line and a positive electrode or a negative electrode of the power supply are pressed against both sides of the insulating strip; and one side of the insulating strip is fixed on the shell, and the middle part of the insulating strip is located in a path which the locking end of the lead seal rope passes through.

It can be seen from the above description that the power switch is of an insulating strip structure that blocks the conduction of the electrodes; the insulating strip is sandwiched between one electrode of the power supply and the power line connected to the chip; after the insulating strip is removed, the power supply is conducted with the power line to supply power to the chip; the power switch is located at a position adjacent to a path which the locking end of the lead seal rope passes through; one side of the insulating strip extends through the path and is fixed on the shell at the other side of the path, thus, when the lead seal rope passes through the locking hole of the locking end and rushes to the middle of the insulating strip, the insulating strip sandwiched between the power line and one electrode of the power supply is pulled out, thus, the power supply is conducted and supplies power to the chip, and the working state of the lead seal is switched from the original passive working state to the semi-active working state (the working state code is changed from 0x0000 to 0x0003).

Further, the power line is of a bending or compression spring type elastic conductive sheet; and one end of the elastic conductive sheet is electrically connected to the chip, and the other and of the elastic conductive sheet is pressed against one side of the insulating strip.

It can be seen from the above description that the power line is set as an elastic conductive sheet, so that the power supply and the chip can be reliably and stably conducted through the elastic pressing of the power line after the insulating strip is removed, which ensures that the actual state can be accurately identified by the working state code of the lead seal.

Further, a one-way locking mechanism is arranged in the locking hole. The locking end of the lead seal rope passes through the one-way locking mechanism and is locked and fixed reversely.

It can be seen from the above description that the one-way locking mechanism is arranged in the locking hole, and the locking end of the lead seal rope is fixed in the shell and cannot be withdrawn, so that when the electronic seal is unlocked, the lead seal rope can only be cut off to ensure the security performance of the electronic seal.

Further, the power supply is a primary battery.

It can be seen from the above description that the power supply is set as the primary battery, and preferably, a battery with a low capacity and only one service cycle is selected to improve the tamper-proofing performance of the electronic seal.

The electronic seal of the present disclosure can be used in logistics or asset management, especially in the long-distance transportation of valuable or important goods. The actual state of the electronic seal provided by the present disclosure can be accurately marked through physical changes, and physical marks cannot be changed, and therefore, the electronic seal can effectively achieve the effects of tamper proofing and recycling. The electronic seal has a relatively high supervision security performance and provides an effective guarantee for the security control of goods.

Figure 2:
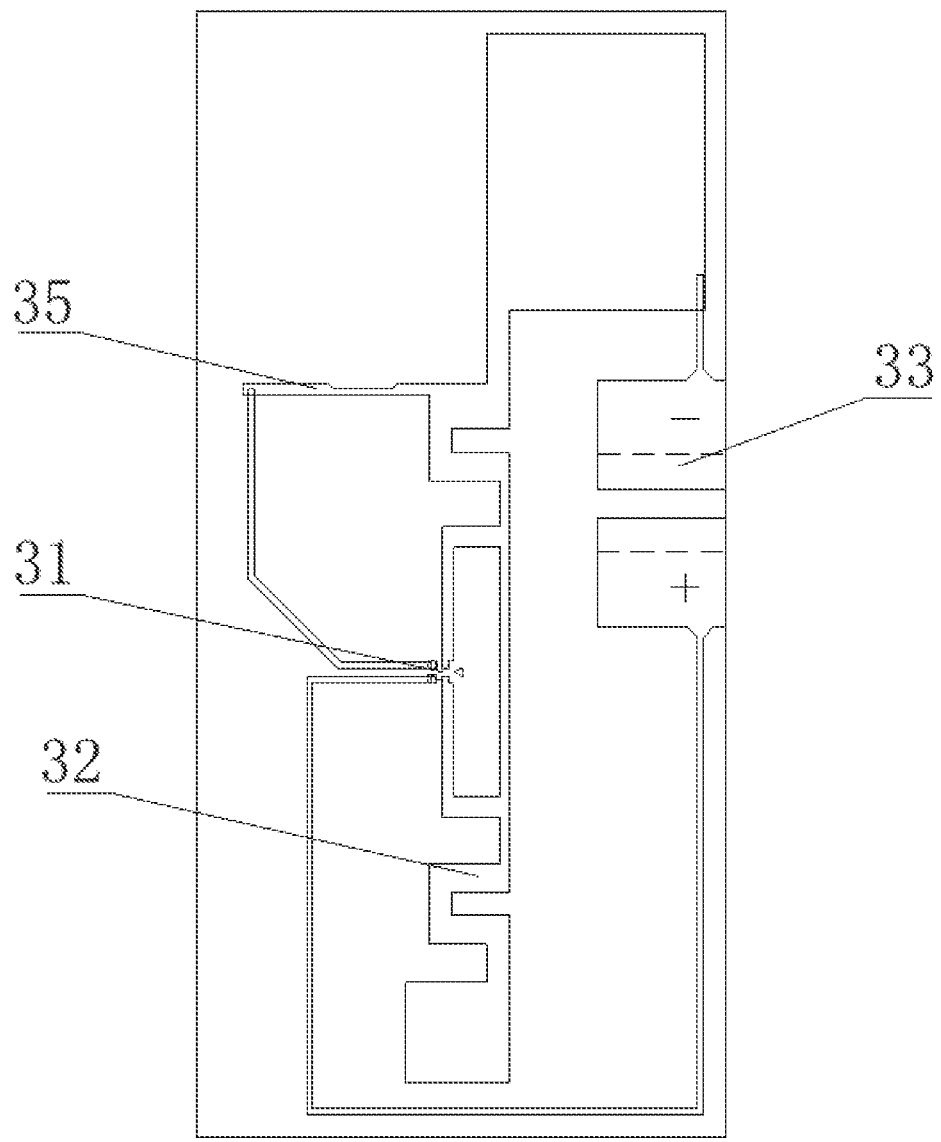
FIG. 2 is a schematic structural view of a lead seal label of a tamper-proofing electronic seal according to an embodiment I of the present disclosure.
Figure 3:
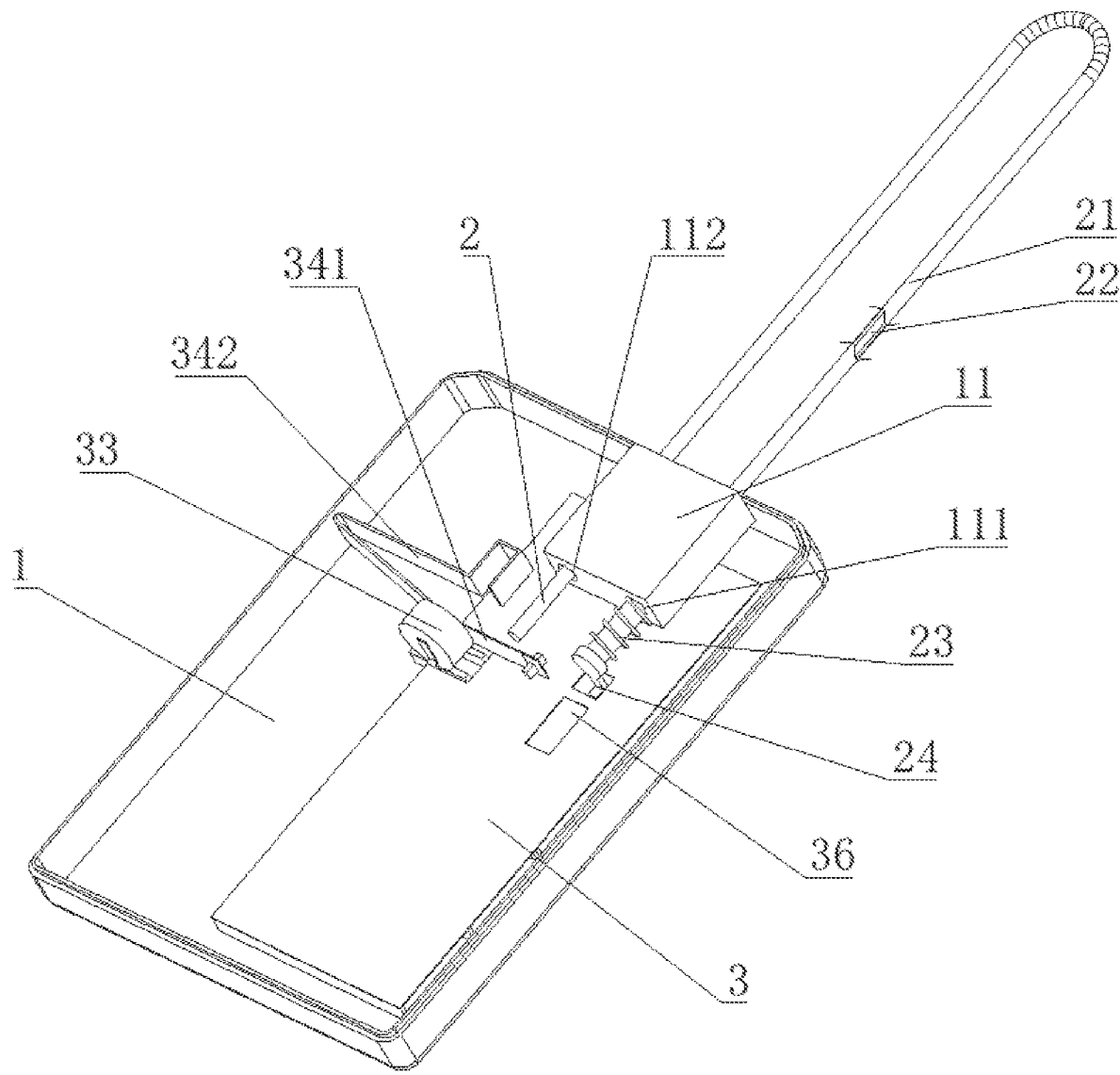
FIG. 3 is a schematic view of an inner structure of a tamper-proofing electronic seal according to an embodiment I of the present disclosure.

Referring to FIG. 1 to FIG. 3, an embodiment I of the present disclosure is as follows:

The tamper-proofing electronic seal includes a shell 1, a lead seal rope 2, and a lead seal label 3 arranged in the shell 1.

As shown in FIG. 2, the lead seal label 3 includes a chip 31, an antenna circuit 32, a power supply 33, a power switch 34, and a potential detection circuit 35. The chip 31 is a four-pin chip with two general-purpose input ports, that is, the chip 31 includes a first pin, a second pin, a third pin and a fourth pin. The antenna circuit 32 is a UHF (ultrahigh frequency) antenna including a first arm and a second arm; and a port near the middle is electrically connected to the first pin and the second pin of the chip 31. The power supply 33 is a low-capacity primary battery. A positive electrode of the power supply 33 is connected to the third pin of the chip 31 through a circuit, and a negative electrode of the power supply 33 is connected to the first pin of the chip 31 through the power switch 34. Both ends of the potential detection circuit 35 are connected to the fourth pin of the chip 31 and the first arm of the antenna circuit 32 respectively, and the fourth pin is a detection input pin.

As shown in FIG. 3, a main circuit board of the lead seal label 3 is arranged in the square shell 1 through supporting ribs. The power supply 33 and the potential detection circuit 35 are located at adjacent positions, facing to one side of the top of the shell, the circuit board. Two through holes 36 are respectively formed in positions, located at the two sides of the potential detection circuit 35, of the circuit board, so that the potential detection circuit at this position forms a relatively thin short line. A blocking block 11 is arranged at a position, close to the top, of the interior of the shell 1. A fixing hole 111 and a locking hole 112 which penetrate towards both ends of the shell 1 are arranged in the blocking block 11 side by side. The fixing hole 111 is a stepped hole facing the potential detection circuit 35. The inner diameter of one end, facing the middle of the shell 1, of the fixing hole 111 is smaller than the inner diameter facing the top of the shell 1. The two ends of the lead seal rope 2 are a fixing end and a locking end respectively. Specifically, the lead seal rope 2 includes an outer sheath 21 and an inner rope 22. The outer sheath 21 is sleeved outside the inner rope 22, and the inner rope 22 can move in the outer sheath 21. The end of the outer sheath 21 at the fixing end of the lead seal rope 2 is clamped in the fixing hole 111, and the end of the inner rope 22 passes through the fixing hole 111 and extends into the shell 1. The end, extending into the shell 1, of the inner rope 22 is sleeved with a compression spring 23. The end of one end, close to the compression spring 23 and facing away from the fixing hole 111, of the inner rope 22 is connected to a T-shaped block having a foot portion inserted into the compression spring 23 so as to press against the end of the compression spring 23. A hook knife 24 is arranged at the end, close to the potential detection circuit 35, of the compression spring 23. One end of the hook knife 24 passes through the through hole 36 closer to the compression spring 23 in the circuit board. The outer diameter of the compression spring 23 is larger than the inner diameter of one end, facing toward the middle, of the fixing hole 111. A one-way locking mechanism (not shown in the figure) is arranged in the locking hole 112. The locking end of the lead seal rope 2 passes through the one-way locking mechanism and is locked and fixed reversely, that is, the locking end of the lead seal rope 2 cannot be withdrawn after passing through the locking hole 112. Preferably, a steel wire rope is used as the inner rope 22.

The power switch 34 includes an insulating strip 341 and a power line 342. One end of the power line 342 is electrically connected to the chip 31, and the other end of the power line 342 and the negative pole of the power supply 33 are pressed against both sides of the insulating strip 341, that is, the insulating strip 341 is sandwiched between the other end of the power line 342 and the negative pole of the power supply 33 to obstruct the path between the power line 342 and the power supply 33, so that the power switch 34 is in an off state. After the insulating strip 341 is removed, the power supply 33 is conducted with the power line 342 to supply power to the chip 31, and the power switch 34 is in a permanent closed state. The power line 342 can be a bending/compression spring type elastic conductive copper sheet. The power line 342 is pressed against the other side of the insulating strip 341 through the elasticity thereof to realize the situation that the negative electrode pressed against the power supply 33 is conducted after the insulating strip 341 is removed. An insulating plastic film can be used as the insulating strip 341. One side of the insulating strip 341 extends towards a path which the locking end of the lead seal rope 2 passes through to reach the other side of the path through which the locking end 2 passes and is fixed on the shell 1, thus, when the locking end of the lead seal rope 2 passes through the locking hole 112 and is fixed, the locking end rushes to the middle of the insulating strip 341, so that insulating strip 341 sandwiched between the power supply line 342 and the negative electrode of the power supply 33 is pulled out, the power supply 33 and the chip 31 are conducted, and the external structure of the lead seal is locked while the marking state of the internal label is triggered to change.

While the locking end of the lead seal rope 2 is inserted into the locking hole 112 and fixed, the inner rope 22 is pulled towards the exterior of the shell 1 in the outer sheath 21; one end, facing toward the fixing hole 111, of the compression spring 23 is pressed against the fixing hole 111, the other end of the compression spring 23 is pulled by the inner rope 22 to compress, the inner rope 22 is kept tight through the one-way locking mechanism, so that in the locked state of the electronic seal, a compressed state is kept to store elastic potential energy. When the inner rope 22 of the lead seal rope 2 is disconnected, the elastic force of the compression spring 23 returns to the original state to bounce the inner rope 22 and the compression spring 23 to the adjacent potential detection circuit 35, and then the hook knife on the compression spring 23 will hook off the relatively thin short line of the potential detection circuit 35 to damage the potential detection circuit 35, and thus, an unlocking mark is generated. Preferably, the potential detection circuit 35 is the fragile line.

In summary, the semi-active electronic tag which includes the potential detection circuit and the power switch is arranged in the tamper-proofing electronic seal provided by the present disclosure. The lead seal rope structure of the electronic seal acts on the potential detection circuit and the power switch, and a physical state mark of two times two is generated through the on-off of the potential detection circuit and the on-off of the power switch, so that the electronic seal has different irreversible physical change marks in unlocked, locked and destroyed or unlocking states, then the use state of the electronic seal can be accurately marked, the electronic seal is prevented from being tampered with or recycled, and the supervision security performance of the electronic seal is improved.

The foregoing descriptions are merely preferred embodiments of the present disclosure but are not intended to limit the patent scope of the present disclosure. Any equivalent modifications made to the structures or processes based on the content of the specification and the accompanying drawings of the present disclosure for direct or indirect use in other relevant technical fields shall also be encompassed in the patent protection scope of the present application.

The invention claimed is:

1. A tamper-proofing electronic seal, comprising:
a shell, a lead seal rope, and a lead seal label arranged in the shell, wherein the lead seal label comprises a chip, an antenna circuit, a power supply, a power switch, and a potential detection circuit;
the antenna circuit is electrically connected to the chip;
the power supply is electrically connected to the chip through the power switch;
both ends of the potential detection circuit are electrically connected to the antenna circuit and the chip respectively; and
a fixing hole is provided at a position, adjacent to the potential detection circuit, of the interior of the shell;
a locking hole is provided at a position, corresponding to the power switch, of the interior of the shell;
the fixing end of the lead seal rope passes through the fixing hole and is clamped in the shell;
when the locking end of the lead seal rope passes through the locking hole, the locking end is fixedly connected to the shell and closes the power switch; and
when the middle part of the lead seal rope is disconnected, the lead seal rope passes through the end of the fixing hole to move towards the potential detection circuit and disconnect the potential detection circuit.

2. The tamper-proofing electronic seal according to claim 1, wherein the lead seal rope comprises an outer sheath and an inner rope slidably arranged in the outer sheath, wherein the end of the outer sheath is clamped in the fixing hole; the end of the inner rope passes through the fixing hole and extends into the shell; a compression spring is sleeved on the end, extending into the shell, of the inner rope; the end, facing away from the fixing hole, of the compression spring is fixedly connected to the inner rope; the outer diameter of the compression spring is larger than the inner diameter of the fixing hole; and when the locking end of the lead seal rope passes through the locking hole and is fixed, the inner rope drives the compression spring to compress.

3. The tamper-proofing electronic seal according to claim 2, wherein through holes are respectively provided on two sides, corresponding to the potential detection circuit, of the lead seal label; a hook knife is arranged at one end, far away from the fixing hole, of the compression spring; and one end of the hook knife passes through the through holes of the potential detection circuit.

4. The tamper-proofing electronic seal according to claim 1, wherein the power switch comprises an insulating strip and a power line, wherein one end of the power line is electrically connected to the chip, and the other end of the power line and a positive electrode or a negative electrode of the power supply are pressed against both sides of the insulating strip; and one side of the insulating strip is fixed on the shell, and the middle part of the insulating strip is located in a path which the locking end of the lead seal rope passes through.

5. The tamper-proofing electronic seal according to claim 4, wherein the power line is of a bending or compression spring type elastic conductive sheet, one end of the elastic conductive sheet is electrically connected to the chip, and the other end of the elastic conductive sheet is pressed against one side of the insulating strip.

6. The tamper-proofing electronic seal according to claim 1, wherein a one-way locking mechanism is arranged in the locking hole, and the locking end of the lead seal rope passes through the one-way locking mechanism and is locked and fixed reversely.

7. The tamper-proofing electronic seal according to claim 1, wherein the power supply is a primary battery.

* * * * *